(12) United States Patent
Thompson et al.

(10) Patent No.: US 8,057,717 B2
(45) Date of Patent: Nov. 15, 2011

(54) METHOD FOR ASSEMBLING ARTICLES

(75) Inventors: John E. Thompson, Sarasota, FL (US); Corrie S. Roytek, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 86 days.

(21) Appl. No.: 12/436,455

(22) Filed: May 6, 2009

(65) Prior Publication Data

US 2009/0212455 A1 Aug. 27, 2009

Related U.S. Application Data

(62) Division of application No. 11/118,900, filed on Apr. 29, 2005, now abandoned.

(51) Int. Cl.
*B29C 44/12* (2006.01)

(52) U.S. Cl. ............ 264/45.5; 264/45.6; 264/46.4; 264/46.5; 264/255

(58) Field of Classification Search ............ None
See application file for complete search history.

(56) References Cited

U.S. PATENT DOCUMENTS

| | | | |
|---|---|---|---|
| 2,866,497 A * | 12/1958 | Struthers | 5/655.9 |
| 3,161,436 A * | 12/1964 | Hood | 297/452.27 |
| 3,487,134 A * | 12/1969 | Burr | 264/46.6 |
| 3,844,614 A | 10/1974 | Babbs | |
| 3,872,199 A * | 3/1975 | Ottinger | 264/46.4 |
| 3,874,731 A | 4/1975 | Jordan | |
| 4,073,539 A | 2/1978 | Caruso | |
| 4,814,036 A | 3/1989 | Hatch | |
| 5,017,115 A | 5/1991 | Yanagishita | |
| 5,116,557 A | 5/1992 | Debaes | |
| 5,130,074 A | 7/1992 | Sakamoto | |
| 5,164,137 A | 11/1992 | Omata | |
| 5,176,860 A | 1/1993 | Storch | |
| 5,238,513 A | 8/1993 | Gill | |
| 5,238,514 A * | 8/1993 | Tornero | 156/196 |
| 5,353,734 A | 10/1994 | Tani | |
| 5,389,317 A * | 2/1995 | Grimmer | 264/46.5 |
| 5,395,473 A | 3/1995 | Nixon | |
| 5,512,233 A | 4/1996 | Gallagher | |

(Continued)

FOREIGN PATENT DOCUMENTS

DE 4300376 * 1/1994

(Continued)

OTHER PUBLICATIONS

International Search Report issued in a corresponding international application; European Patent Office, Feb. 1, 2007, 2 pages.

*Primary Examiner* — Edmund H. Lee
(74) *Attorney, Agent, or Firm* — Baker & Daniels LLP

(57) ABSTRACT

Methods and tools for assembling an article are provided. The method includes providing a mold having a cavity configured as a desired shape, positioning a base within the mold so that a surface of the base material is exposed, applying a coating material, e.g., urethane or polyurethane, to substantially cover both the exposed surface of the base and an inner surface of the cavity, depositing a cushion material into the cavity and sealing the cavity with the exposed surface of the base so that the coating material forms a skin around the cushion material and adheres the cushion material to the base.

26 Claims, 10 Drawing Sheets

U.S. PATENT DOCUMENTS

| | | |
|---|---|---|
| 5,580,501 A | 12/1996 | Gallagher |
| 5,603,874 A | 2/1997 | Ishii |
| 5,662,996 A | 9/1997 | Jourquin |
| 5,681,087 A | 10/1997 | Yamano |
| 5,730,917 A | 3/1998 | Ishikawa |
| 5,738,810 A | 4/1998 | De Flippo |
| 5,858,159 A | 1/1999 | Holbrook |
| 5,895,096 A | 4/1999 | Massara |
| 5,925,215 A | 7/1999 | Kon |
| 5,938,993 A | 8/1999 | Greene |
| 5,972,149 A | 10/1999 | Schiller |
| 6,120,630 A | 9/2000 | Lorbiecki |
| 6,419,863 B1 | 7/2002 | Khac |
| 6,444,303 B1 | 9/2002 | Ali |
| 6,832,421 B2 | 12/2004 | Ashida |
| 7,431,962 B2 * | 10/2008 | De Winter et al. ............ 427/133 |
| 2005/0244628 A1 * | 11/2005 | Turek et al. ................ 428/318.4 |

FOREIGN PATENT DOCUMENTS

| | | |
|---|---|---|
| GB | 1325622 | 8/1973 |
| WO | WO 93/24294 A | 12/1993 |

* cited by examiner

METHOD FOR ASSEMBLING ARTICLES

RELATED APPLICATION

This application is a divisional of U.S. Non-Provisional patent application Ser. No. 11/118,900, to Thompson et al., filed Apr. 29, 2005, titled "Method for Assembling Articles," the entire disclosure of which is expressly incorporated by reference herein.

FIELD OF THE INVENTION

The invention provides methods and tools for assembling articles, e.g., seats for vehicles.

BACKGROUND OF THE INVENTION

Recreational vehicles, such as all-terrain vehicles, personal watercraft, snowmobiles, and motorcycles are generally provided with seats having a cushion material attached to a seat base. The cushion material is generally surrounded by a protective coating, e.g., a waterproof coating. Vehicle seats are often made by assembling separately produced components such as the seat base, cushion material, protective cover and one or more fastening components. A piece of cushion material is often separately manufactured and then covered with a piece of protective material such as vinyl or leather. A portion of the protective cover is then stapled, stitched, screwed, glued or attached using any other fastening component to a seat base. If an emblem is desired, it is often stitched onto the protective cover.

According to one aspect of the present invention, a method of assembling an article is provided that comprises the steps of: providing a mold having a cavity configured as a desired shape; positioning a base within the mold so that a surface of the base material is exposed, applying coating material to substantially cover both the exposed surface of the base and an inner surface of the cavity; and depositing a cushion material into the cavity and sealing the cavity so that the coating material forms a skin around the cushion material and adheres the cushion material to the base.

According to another aspect of the present invention, a method of assembling an article is provided that comprises the steps of: applying coating material into a cavity of a mold that defines a desired profile; depositing expandable cushion material into the cavity of the mold; closing a lid of the mold and allowing the expandable cushion material to expand to a volume defined by the mold and the lid; opening the lid; and adhering a base to the expandable cushion material by applying a coating material between the base and the expandable cushion material.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless otherwise indicated, the drawings are to scale so that the components are proportional to one another.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
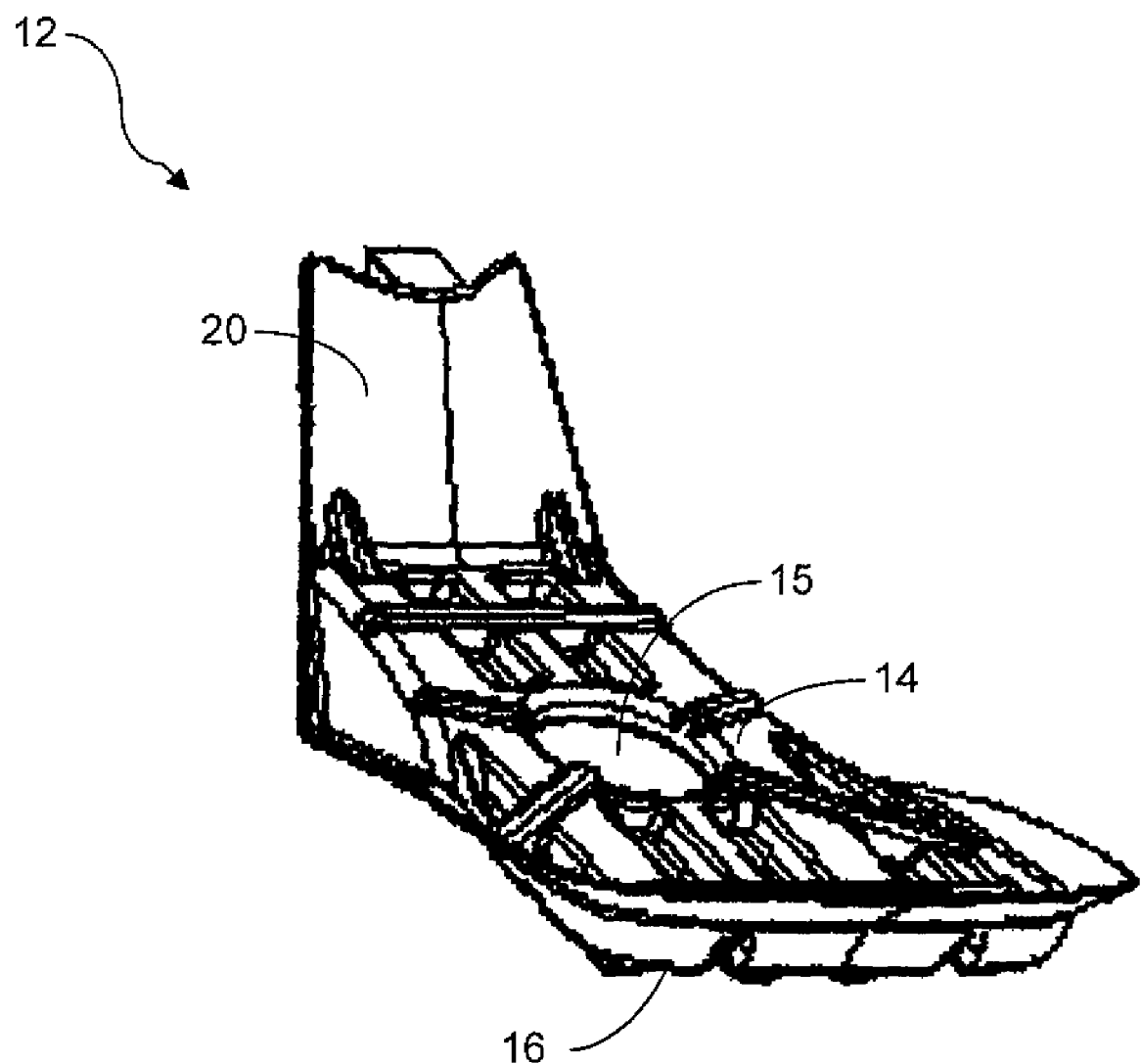
FIG. 1 is a perspective view of a seat base according to an embodiment of the invention.

FIG. 1 illustrates a seat base 12 according to an embodiment of the invention, which includes a top surface 14 and a bottom surface 16. The seat base 12 has a desired shape depending upon the vehicle in which it is used. The base typically comprises a rigid plastic component e.g., HDPE, formed by a molding process. However, the base can be made of any suitable material which adheres to the coating material. The top surface 14 is adapted for being adhered to a cushion material and the bottom surface 16 is configured to be mounted on a seating area of a given vehicle, e.g., an all-terrain vehicle, a motorcycle, a snowmobile, moped, scooter, utility vehicle or a personal watercraft. The bottom surface 16 often includes a number of ribs, which imparts structural integrity to the base, although this is not required. The seat base 12 also includes a forward narrow portion 20 for allowing the operator's legs increased room for comfort. In some cases, the seat bases include a ventilation aperture 15, which allows the cushion material to breathe. Often times, the cushion material itself contains a breathable cavity and air is allowed to enter into this breathable cavity through this ventilation aperture 15. Of course, this ventilation aperture is purely optional.

The seat base is generally attached directly to a vehicle frame or to a rear cab portion of the vehicle. The base can be mounted to the vehicle according to a wide variety of mounting techniques known in the art. In some cases, the bottom surface 16 has a slide in hook type fastener (not shown) at the narrow portion 20 which holds the front of the base down upon the vehicle and includes a latching mechanism (not shown) at the opposite end of the seat base which attaches the seat to the vehicle. This effectively secures the base in place upon a vehicle. In addition, the seat may also include a backrest section (not shown) for an operator or passenger.

Figure 2:
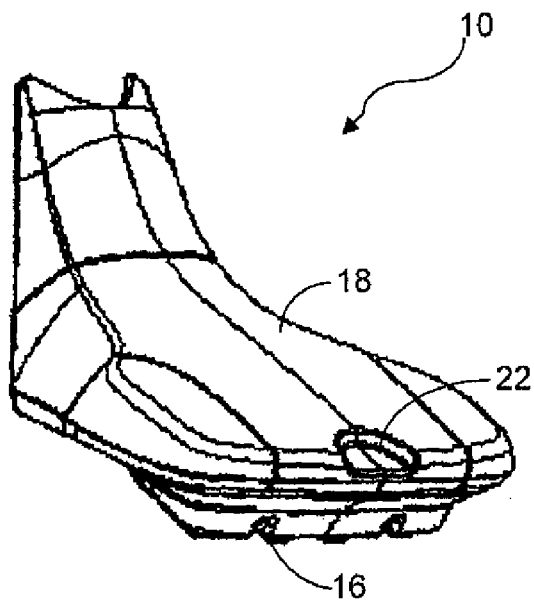
FIG. 2 is a perspective view of a seat according to an embodiment of the invention.
Figure 3:
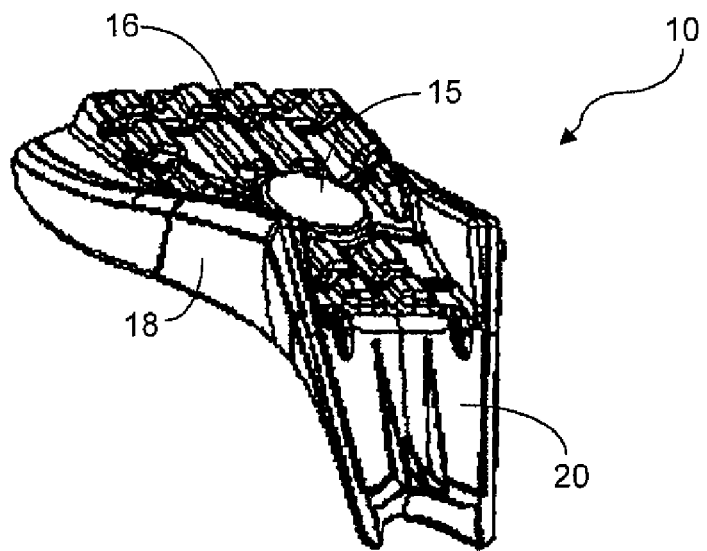
FIG. 3 is an upside down perspective view of the seat of FIG. 2.

FIGS. 2 and 3 illustrate an assembled vehicle seat 10 according to an embodiment of the invention. The seat 10 includes a seat base 12 having a top surface 14 and a bottom surface 16. A cushion material 18 is adhered to the top surface 14 of the seat base 12 by a layer of coating material (not shown) and without the use of staples or other mechanical fasteners. In some cases, the cushion material 18 includes an inner breathable cavity (not shown). The bottom surface 16 of the seat base 12 remains exposed after the seat 10 is completed, so the seat 10 can be attached to an appropriate place in or on a vehicle.

The cushion material 18 also has an outer covering 48 of coating material, which serves to protect and waterproof the cushion material 18. A rider sits on the cushion material 18 and covering of coating material 48 when operating the vehicle. The covering 48 can include one or more seat features 22, e.g., definition lines, patterns, emblems and textures, depending on how a designer wants the seat to look. This is especially useful as designers generally desire hard lines on the seat for styling. The covering may also include paints and/or decals embedded therein. Such features are incorporated within the coating material cover 48. This covering 48 can be comprised of a single layer of coating material or more than one layers. In some cases, a first inner layer of coating material is provided which serves a protective cover and a second outer layer of coating material is provided over the first layer and includes the desired seat features. These layers are generally applied separately to the cushion material while in different molds.

A mold is also provided for producing a seat according to an embodiment of the invention. The mold has a hollow cavity for producing a cushion material having a desired shape. The cavity has an opening which is generally smaller in cross-sectional area than the hollow interior. The shape, size and topography of the cavity will largely depend on the type of seat being made, e.g., a motorcycle seat, an ATV seat, a snowmobile seat and the like. The hollow cavity can also have areas or crevices configured as lines, patterns, textures or other features desired to be imparted into the coating material cover 48 itself. The layer of coating material fills the crevices defining the detailed features and once hardened, retains these features. One advantage of such process is that such desired features can be imparted into the layer of coating material covering the seat without having to insert rigid objects into the seat to create these features. Additionally, the hollow cavity can include one or more ditches, which receives paints or decals. When the coating material is deposited into the cavity, such paints and decals become embedded in the coating material covering once hardened.

Figure 4:
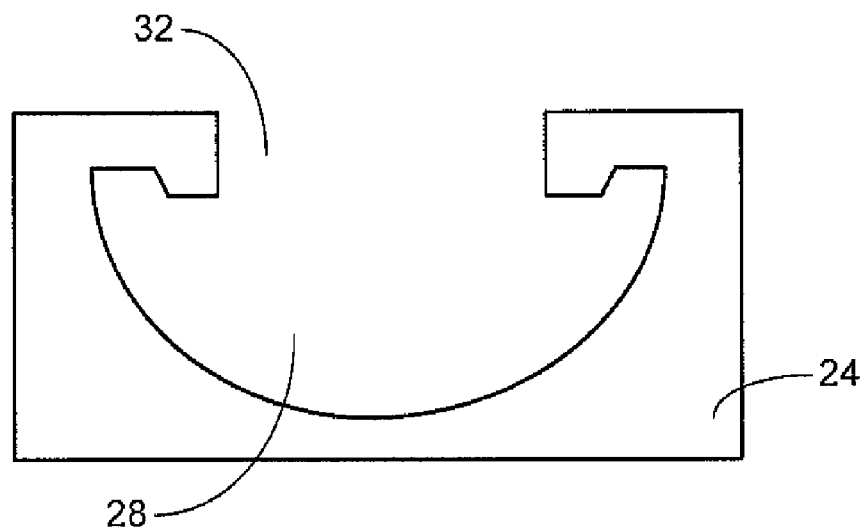
FIG. 4 is a cross-sectional view of a primary mold having a cavity according to an embodiment of the invention.
Figure 5:
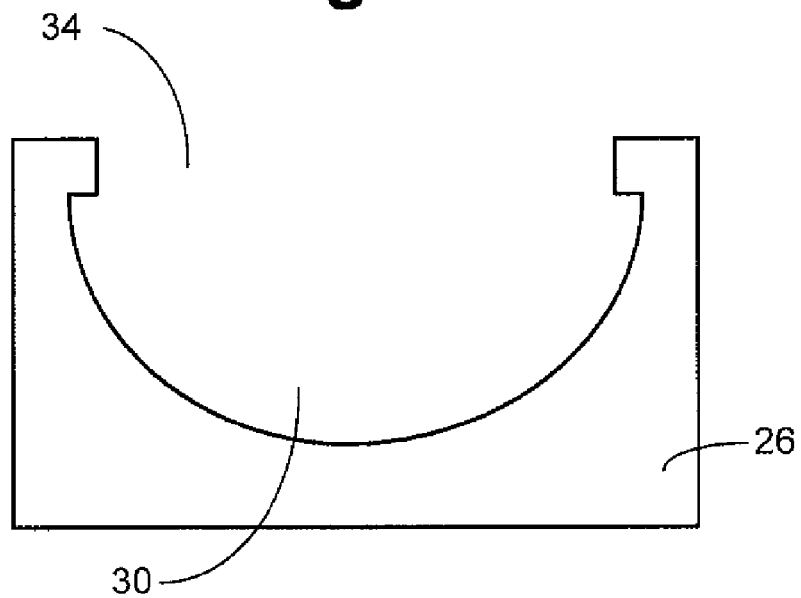
FIG. 5 is a cross-sectional view of a secondary mold having a cavity according to an embodiment of the invention.

In the illustrated embodiment, a vehicle seat 10 is assembled using a primary mold 24 and a secondary mold 26. With reference to FIGS. 4 and 5, the primary mold 24 includes a cavity 28 and an opening 32 to the cavity 28 and the secondary mold 26 includes a cavity 30 and an opening 34 to the cavity 30. The opening 32 of the primary mold 24 is smaller in cross-sectional area than the opening 34 of the secondary mold 26. The primary mold 24 is adapted for receiving a lid having an underside and/or a downwardly extending protrusion, which imparts a desired shape to the top of the cavity 28, as will be described hereinafter. The lid also seals the opening 32 of the cavity 28. The secondary mold 26 is adapted for receiving a seat base 12 within the cavity 30 and also for receiving a lid to seal the opening 34 of the cavity 30. In many cases, the seat base is attached to the underside of the lid. The larger opening 34 of the secondary mold 26 makes it easier for a seat base 12 to be positioned within the cavity 30.

The primary and secondary molds 24, 26 can be made using standard procedures known to those in the art. For example, the molds can be comprised of machined billet shells. The shells are generally made of a metal, e.g., nickel. In some cases, the surface of the metal shell includes a layer of a more durable metal, e.g., chrome. This increases the durability of the shell. Additionally, the interior surface of the shell, which forms the cavity of the mold, can have an acid etched grain. This etching forms any desired crevices, ditches and the like which impart desirable features into the coating material cover.

The primary mold 24 is adapted for receiving a lid having an underside and/or downwardly extending protrusion, which imparts a shape to the top of the cavity 28. The lid underside can have a variety of shapes. The lid underside generally has the same profile or shape as the top surface of a desired seat base and imparts a shape into a cavity having that same profile. In many cases, the lid underside also contains a downwardly extending protrusion which imparts a groove or space into the cushion material for a breathable cavity. When the cushion material is deposited into the cavity and then allowed to harden, it has a portion retaining a shape corresponding to the top portion of a desired seat base, so the top portion can later be mated with the cushion material.

Figure 6:
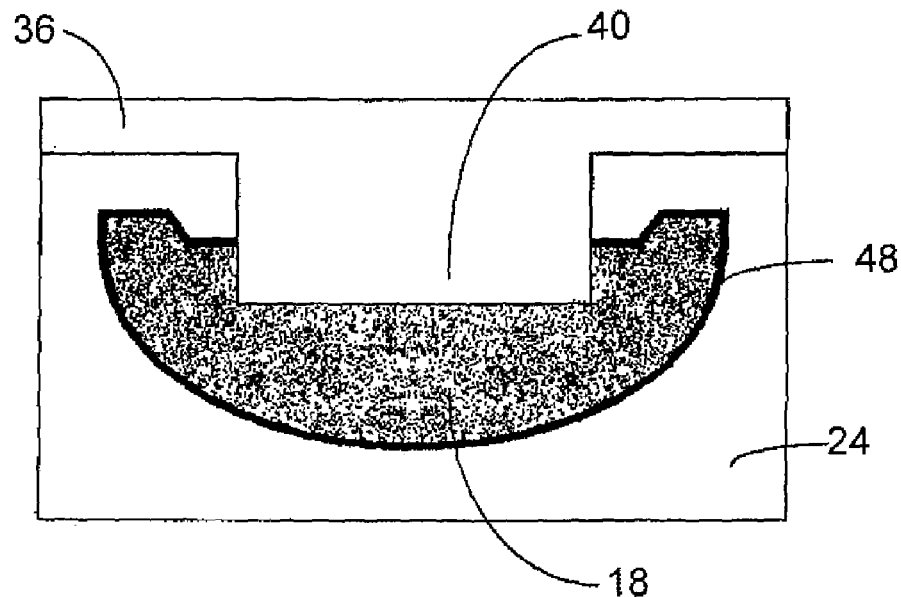
FIG. 6 is a cross-sectional view of a primary mold having a lid according to an embodiment of the invention.
Figure 7:
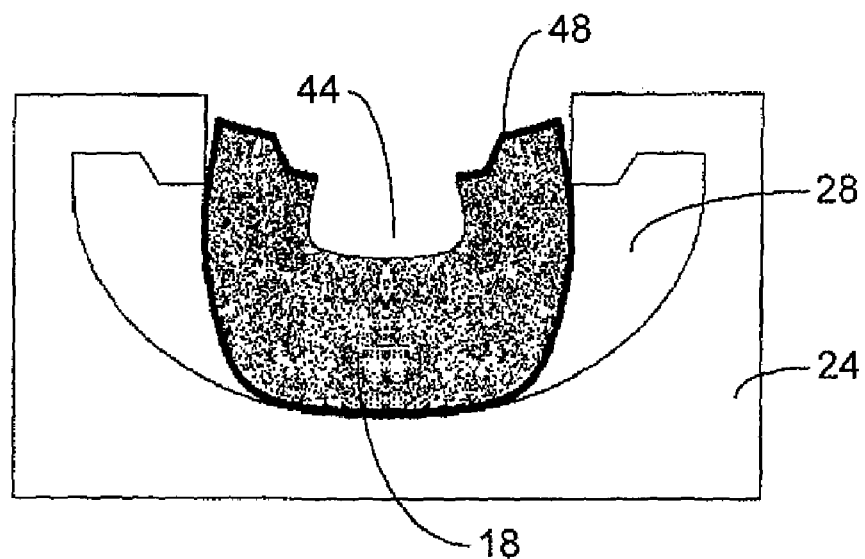
FIG. 7 is a cross-sectional view of the primary mold of FIG. 6 having a shaped cushion material according to an embodiment of the invention.
Figure 9:
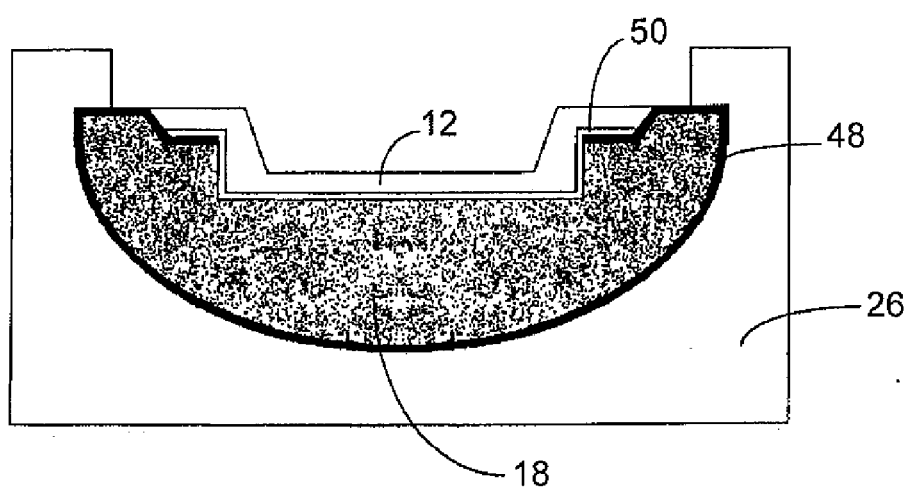
FIG. 9 is a cross-sectional view of the secondary mold of FIG. 8 receiving a seat base according to an embodiment of the invention.
Figure 10:
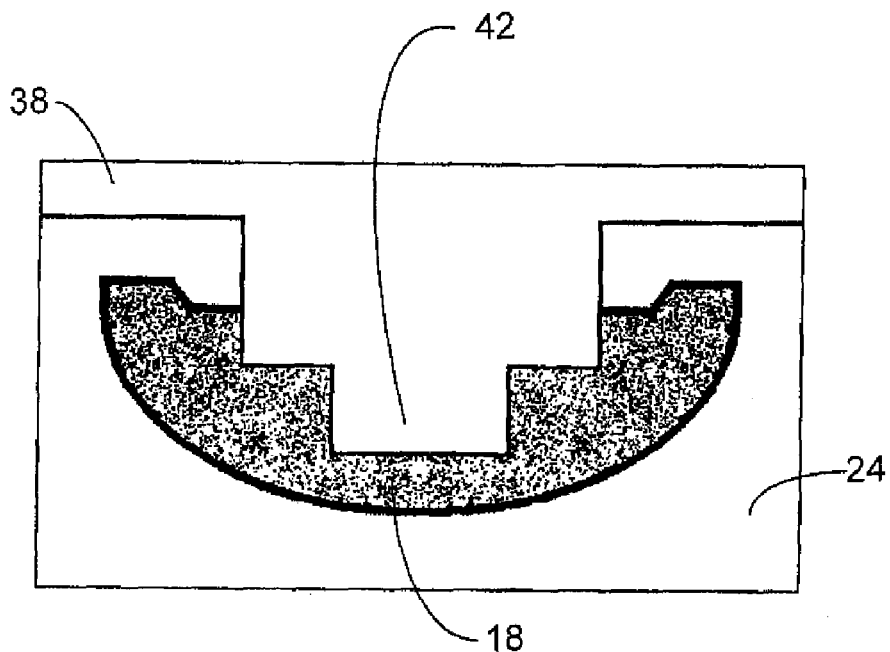
FIG. 10 is a cross-sectional view of a primary mold having a lid according to another embodiment of the invention.
Figure 11:
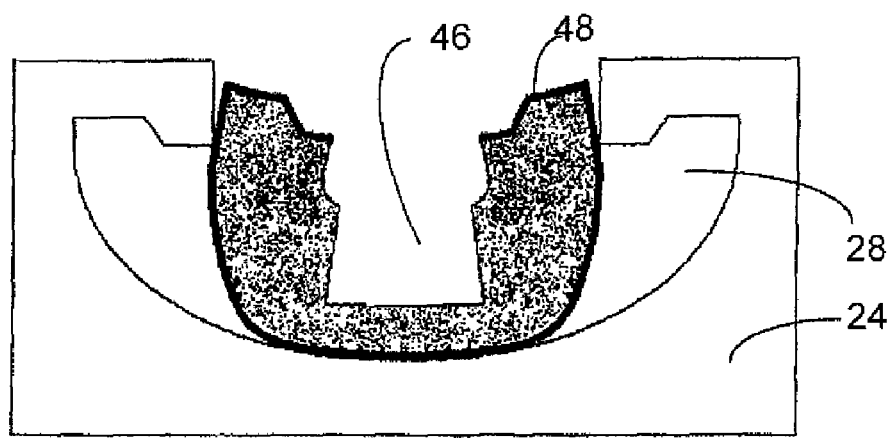
FIG. 11 is a cross-sectional view of the primary mold of FIG. 10 having a shaped cushion material according to an embodiment of the invention.

FIGS. 6 and 7 illustrate a primary mold 24 having a lid 36 having an underside 40 according to one embodiment and FIGS. 10 and 11 illustrate a primary mold 24 having a lid 38 having an underside 42 and protrusion according to another embodiment. With reference to FIGS. 6 and 7, the mold 24 receives a lid 36 having an underside 40 having a profile or shape which is the same or substantially similar to the top portion 14 of the seat base show in FIG. 9. Once the lid 36 is secured about the opening 32, the underside 40 imparts a shape 44 into the cavity (as shown in FIG. 7) which corresponds to shape of the top surface 14.

With references to FIGS. 10 and 11, the mold 24 in this embodiment receives a lid 38 having an underside 42 which also includes a protrusion which extends into the cavity for forming a breathable cavity. The underside 42 of the lid also has a shape which is similar to the top portion 14 of the seat base but also includes a protrusion which extends deeper. Once the lid 38 is secured about the opening 32, the underside 42 imparts a shape 46 into the cavity (as shown in FIG. 11) which corresponds to the shape of the top surface 14 and also a groove which extends further into the cavity for forming the breathable cavity.

Figure 13:
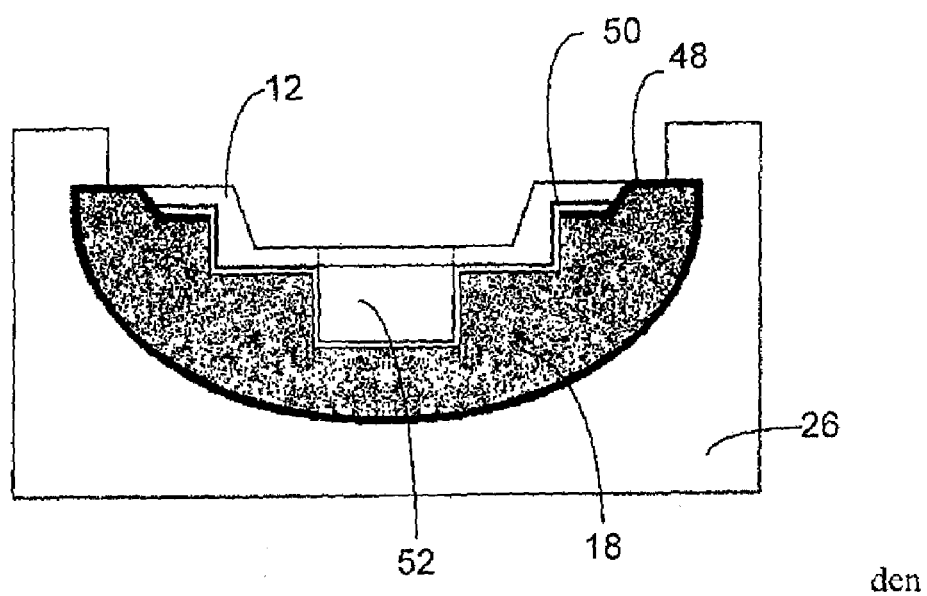
FIG. 13 is a cross-sectional view of the secondary mold of FIG. 12 receiving a seat base according to an embodiment of the invention.

Referring to FIGS. 9 and 13, the secondary mold 26 is configured to receive a seat base 12 inside of the hollow cavity 30. The opening 34 to the cavity is wide enough so that a seat base 12 can be passed through into the cavity 30. The secondary mold 26 is also configured to receive a lid (not shown), which holds the seat base 12 in place against the cushion material 18 and also seals the opening 34 of the cavity.

A method will now be described using the primary and secondary molds as part of an assembly process. A method of assembling a seat will now be described with reference to FIGS. 6-9. Referring to FIG. 6, a primary mold 24 is provided, which has a cavity 28 receiving a lid 36 having a rectangular shaped protrusion. The interior surface of the cavity is then covered with a first layer of coating material 48. In some cases, the interior surface of the cavity is sprayed with a spray of coating material. Additionally, the interior surface of the cavity 28 can also have areas or crevices configured as lines, patterns, textures or other features desired to be imparted into the cushion material 18 itself. The first layer of coating material 48 fills the crevices defining the detailed features and once hardened, retains these features.

Once the cavity 28 is lined with a first layer of coating material 48, a cushion material 18 is then deposited into the cavity 28. The first layer of coating material 48 is generally allowed to cure or harden before depositing the cushion material 18 into the cavity. Suitable cushion materials for providing the inner structure of the seat base 12 include any pourable liquid plastic, sculpted bun stock, and expandable foam. While a variety of cushion materials can be used for this purpose, expandable foam, e.g., isocyanate foam is preferred. The expandable foam can be injected into the cavity 28 using an injection tool, e.g. a reaction injection molding machine, known in the art. With reference to FIG. 6, the lid 36 is then closed against the mold 24 so that the cavity 28 is sealed and lid underside 40 extends into the cavity. The foam or other expandable material is then allowed to expand and fill the volume of the cavity 28. During this time, the first layer of coating material 48 lining the interior surface of the cavity 28 also adheres to the cushion material 18 and solidifies to form an outer protective layer.

In some cases, more than one different type of cushion material is used. For example, different types of cushions, e.g., foams can be positioned in different areas about the cavity to provide varying levels of hardness in different areas of the cushion. In other cases, an inflatable air cushion is placed into the cavity so that the operator can inflate or deflate the cushion to a desired comfort level. When the cushion is inflated, the surrounding cushion material presses against the outer covering, providing a harder, rigid seat. When the cushion is deflated, the surrounding cushion material no longer pressures against the outer covering, providing a softer seat.

Once the foam has fully expanded and solidified, the lid 36 is removed to expose the cavity 28. As shown in FIG. 7, the cushion material 18 has a shape corresponding to the internal volume of the cavity 28. The cushion material 18 also includes a shape 44 on its top, which corresponds to the profile of the top portion 14 of the seat base. The first layer of coating material 48 forms a protective cover protecting the external surface of the cushion material 18 except for the surfaces formed by the shape 44, which contacted the lid underside 40 and did not receive the first layer of coating material 48 during forming. The cushion material 18 is then removed from the primary mold 24.

In many cases, one or more release agents can be used for ensuring that the cushion material and coating material layers are easily released from the mold. For example, Chemtrend CT1007 Wax, a release agent distributed by Chem Trend, a company located in Howell, Mich., may be applied, e.g., wiped, to the mold in areas not in contact with the coating material layer to facilitate release of the cushion material from contact with the mold surface. Likewise, 567 Release is a product distributed by W. N. Shaw and Company, a company located in Villa Ridge, Mo., that is sprayed onto the mold in areas not in contact with the coating material layer to release the cushion material from contact with the surface of the mold cavity itself. ACMOS 36-5111-343 Release is another release product distributed by ACMOS, a company located in Bremen, Germany. The ACMOS product can be used to release the coating material layers from contact with the surface of the mold cavity and is sprayed onto the mold in areas in contact with the coating material layer. The Chem Trend CT1007 Wax typically is applied only once prior to the production run, whereas the W. N. Shaw and Company 567 Release and ACMOS 36-5111-343 are generally applied before each molding cycle. Of course, application of these mold releases may vary.

Figure 8:
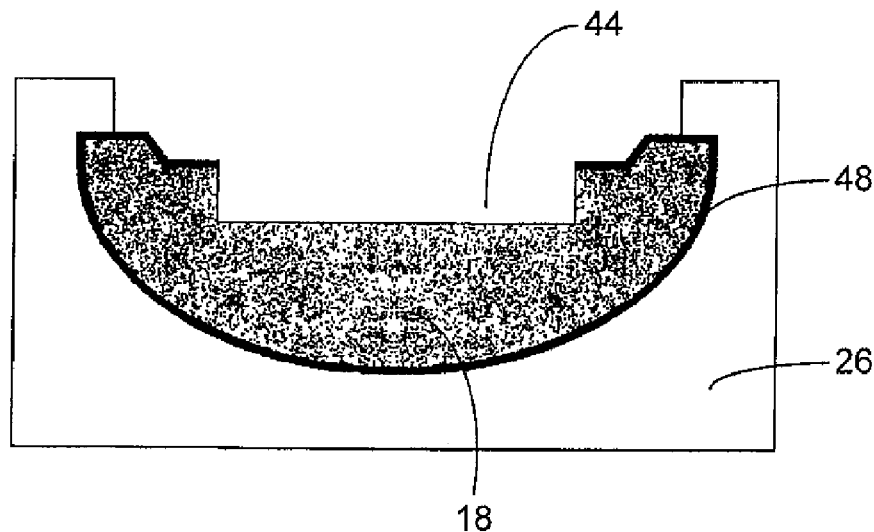
FIG. 8 is a cross-sectional view of a secondary mold receiving the shaped cushion material of FIG. 7 according to an embodiment of the invention.

The cushion material 18 formed in the primary mold 24 shown in FIGS. 6 and 7 is then placed into a secondary mold 26 shown in FIGS. 8 and 9. The secondary mold 26 has a hollow cavity 30 that corresponds to the hollow cavity 28 of the primary mold 24, so that the cushion material 18 formed in the primary mold 24 also fits within the cavity 30 of the secondary mold 26. However, the secondary mold 26 has a wider opening 34 then the primary mold 24, so parts of the exterior surface lined with the first layer of coating material 48 are exposed at the top of the cavity 30. Then, the top, exposed surface of the cushion material 18 is lined with a second layer of coating material 50. Areas of the exterior surface already lined with the first layer of coating material 48 will now also be lined with a second layer of coating material 50. However, the surface lining the shape 44 only has the second layer of coating material 50.

A seat base 12 is provided having a top surface 14 and a bottom surface 16. With reference to FIG. 9, the top surface 14 of the seat base 12 is positioned within the cavity 30 in contact with the second layer of coating material 50 and the cavity 30 is then closed with a lid (not shown). In most cases, the top surface 14 of the seat base 12 is mateable with the shape 44 in the cushion material 18. The seat base 12 can also be flame treated before being positioned within the cavity 30. Flame treatment can be performed by applying a flame, e.g. from a blowtorch, to a given surface, which removes oils and other contaminants which would prevent or decrease adherence of coating material to that surface, as well as, altering the surface properties of the material.

The entire surface area of the seat base 12 can be flame treated or only the top surface 14 which is positioned in contact with the cushion material 18. The second layer of coating material 50 adheres the top surface 14 of the seat base 12 to the cushion material 18 to form a seat 10. The seat base 12 may be additionally heated so that when it comes in contact with the second layer of coating material 50 it alters the cure time. The seat 10 is then removed from the secondary mold 26 and is later mounted in a vehicle. Generally the strength of the connection between the seat base 12 and the cushion material 18 is strong so that the seat 10 can easily be removed from the secondary mold 26. Alternatively, the cushion material 18 formed in the primary mold 24 shown in FIGS. 6 and 7 could simply be placed in a holding fixture (not shown) such that the seat base 12 is clamped to the cushion material 18 after the second layer of coating material 50 is applied between the cushion material 18 and the seat base 12. The seat base 12 again may be flame or heat treated to strengthen the bond of the second layer of coating material 50 between the cushion material 18 and the seat base 12.

A method of assembling a seat having a breathable cavity will now be described with reference to FIGS. 10-13. FIGS. 10-13 illustrate a method of forming a seat 10 wherein the cushion material 18 contains a breathable cavity 52. This method is similar to the method already described with reference to FIGS. 6-9. The main difference in these methods is that the method of FIGS. 10-13 provides a breathable cavity 52 in the cushion material 18.

Referring to FIG. 10, a primary mold 24 is provided, which has a cavity 28 for receiving a lid 38 having an underside 42 which also contains a downwardly extending protrusion. The protrusion extends deeper into the cavity 28 than the under side 42 and forms a space or groove which becomes the breathable cavity 52. The interior surface of the cavity 28 is then covered with a first layer of coating material 48. In certain cases, the interior surface of the cavity 28 is sprayed with a spray of coating material.

Once the cavity 28 is lined with the first layer of coating material 48, a cushion material 18, e.g., an expandable foam is then deposited into the cavity 28. Referring to FIG. 10, the lid 38 is then closed against the mold 24 so that the cavity 28 is sealed and the lid underside 42 extends into the cavity. The foam is then allowed to expand and fill the volume of the cavity 28. During this time, the first layer of coating material 48 lining the interior surface of the cavity 28 also adheres to the cushion material 18 and solidifies to form an outer protective layer.

After the foam has solidified, the lid 38 is removed to expose the cavity 28. As shown in FIG. 11, the cushion material 18 has a shape corresponding to the internal volume of the cavity 28. The cushion material 18 also includes a shape 46 on its top, which was imparted into the material by the lid underside 42. The first layer of coating material 48 forms a protective cover over the external surface of the cushion material 18 except for surface lining the area of shape 46, which contacted the lid underside 42 during forming and did not receive this first layer of coating material 48. The cushion material 18 is then removed from the primary mold 24.

Figure 12:
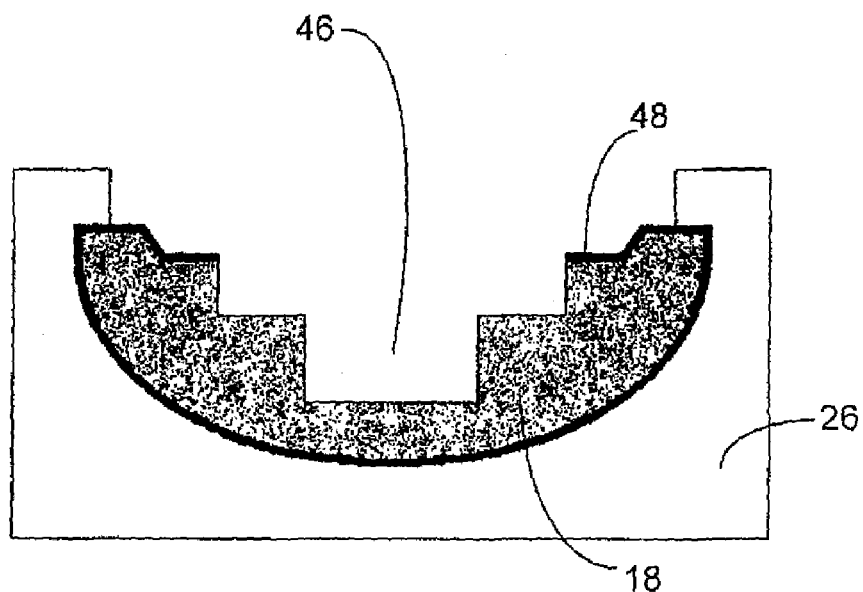
FIG. 12 is a cross-sectional view of a secondary mold receiving the shaped cushion material of FIG. 11 according to an embodiment of the invention.

The cushion material 18 is then placed into a secondary mold 26 shown in FIGS. 12 and 13. The secondary mold 26 has a hollow cavity 30 that corresponds to the hollow cavity 28 of the primary mold 24 of FIGS. 10 and 11, so that the cushion material 18 formed in the primary mold 24 also fits within the cavity 30 of the secondary mold 26. However, the secondary mold 26 has a wider opening 34 then the primary mold 24, so parts of the exterior surface lined with the first layer of coating material 48 are exposed at the top of the cavity 30. Then, either the top, exposed surface of the cushion material 18 or the top surface 14 of a seat base 12 is lined with a second layer of coating material 50. Those parts of the exterior surface already lined with the first layer of coating material 48 will also receive the second layer of coating material 50, so that two layers are provided in these areas. The surface in the area of shape 46 does not have a first layer of coating material 48, so this area will only have a second layer of coating material 50.

The seat base 12 includes a top surface 14 and a bottom surface 16. With reference to FIG. 13, the top surface 14 of the seat base 12 is positioned within the cavity 30 in contact with the top, exposed surface of the cushion material 18 with the second layer of coating material 50 adhering the two surfaces together. The cavity 30 is then closed with a lid (not shown). The top surface 14 of the seat base 12 is mateable with the shape 46 in the cushion material 18, but not with the lower groove of the shape 46, which forms the breathable cavity 52. In this case, when the seat base 12 is placed within the cushion material 18, a breathable cavity 52 is left in the interior of the cushion material 18. The breathable cavity 52 is also lined with the second layer of coating material 50, which forms a protective cover for the breathable cavity 52. The seat base 12 can also be flame treated before being positioned within the shape 46. The second layer of coating material 50 in contact with the seat base 12 adheres the top surface 14 of the seat base 12 to the cushion material 18 to form a seat 10. In some cases, the seat base 12 includes a ventilation aperture 15, which provides an air passage through the seat base 12 into the breathable cavity 52.

The breathable cavity 52 can serve several different purposes depending on the configuration of the seat. For example, in cases where the seat base 12 does not contain one or more ventilation apertures, the seat base 12 (and the second layer of coating material 50) fully seals the breathable cavity, so that air is trapped inside and air cannot move in or out. In these cases, the trapped air in the cavity 52 imparts rigid support and less flexibility to the cushion material. Such a rigid cushion material may be desirable in certain applications. In cases where the seat base 12 does include one or more ventilation apertures, the apertures provide an air passage to the breathable cavity 52 when the seat base 12 is positioned against the cushion material. Air enters into the breathable cavity 52 when a rider is not sitting on the seat and is expelled from the breathable cavity 52 out through the apertures when a rider sits on the seat. In this case, the air trapped in the cavity acts like a spring when riding the vehicle, providing more comfort for the rider. In addition, the cushion material 18 may not be sealed by the second layer of sprayed coating material 50 within the breathable cavity 52. Such a layer of coating material can be strategically applied to the top surface of the seat base or to the exposed cushion material so that coating material does not cover the apertures. This allows air trapped inside the cushion material to be expelled when the rider sits on the seat. When the rider leaves the seat, the air travels back into the cushion material. In most cases, the cushion material and breathable cavity are shielded from water intrusion since the apertures are located on the underside of the seat between the cushion material and the vehicle. However, in some cases, it may be desirable to provide a seat base having its entire surface or one or more surfaces covered with a vapor permeable, liquid impermeable membrane, e.g., Gortex brand, to ensure that no water or liquid is ingested into the cavity while still allowing air and gases to pass in and out of the breathable cavity.

The primary and secondary molds can also each be part of a seat assembly tool 58. For example, with reference to FIGS. 14-16, a seat assembly tool 58 is illustrated according to an embodiment of the invention. The seat assembly tool 58 in this embodiment includes a secondary mold or mold wherein a seat base 12 is attached to the cushion material 18 via a layer of coating material. The tool 58 comprises a first portion 60 and a second portion 62. The first and second portions are connected together by hinges 64 and can be closed against one another to close the tool 58, as shown in FIG. 16. When closed together, the tool 58 forms a rectangular structure, as shown in FIG. 16. However, the closed tool 58 can form any other suitable structure as well.

Figure 14:
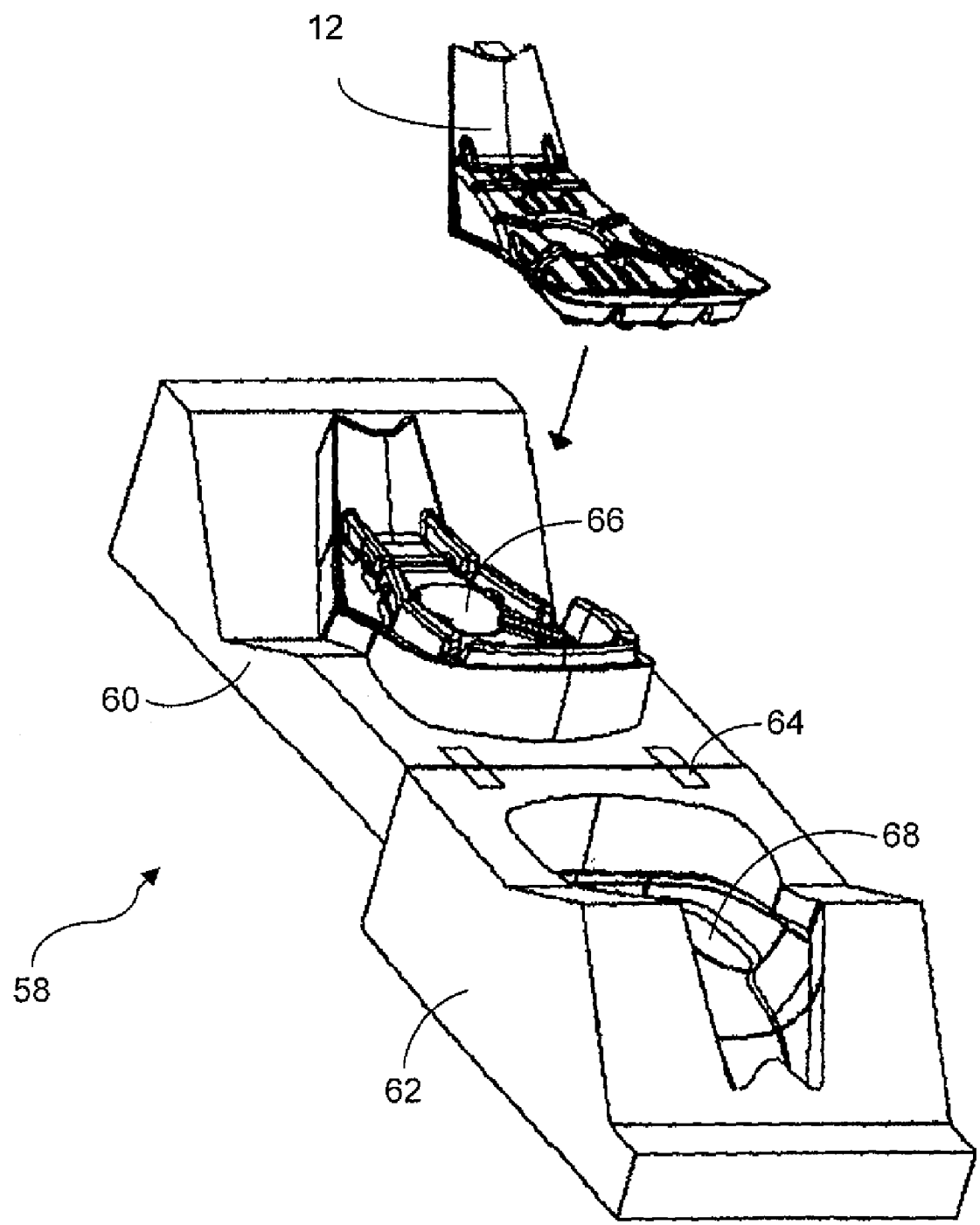
FIG. 14 is perspective view of a seat-forming tool adapted to receive a seat base according to an embodiment of the invention.
Figure 15:
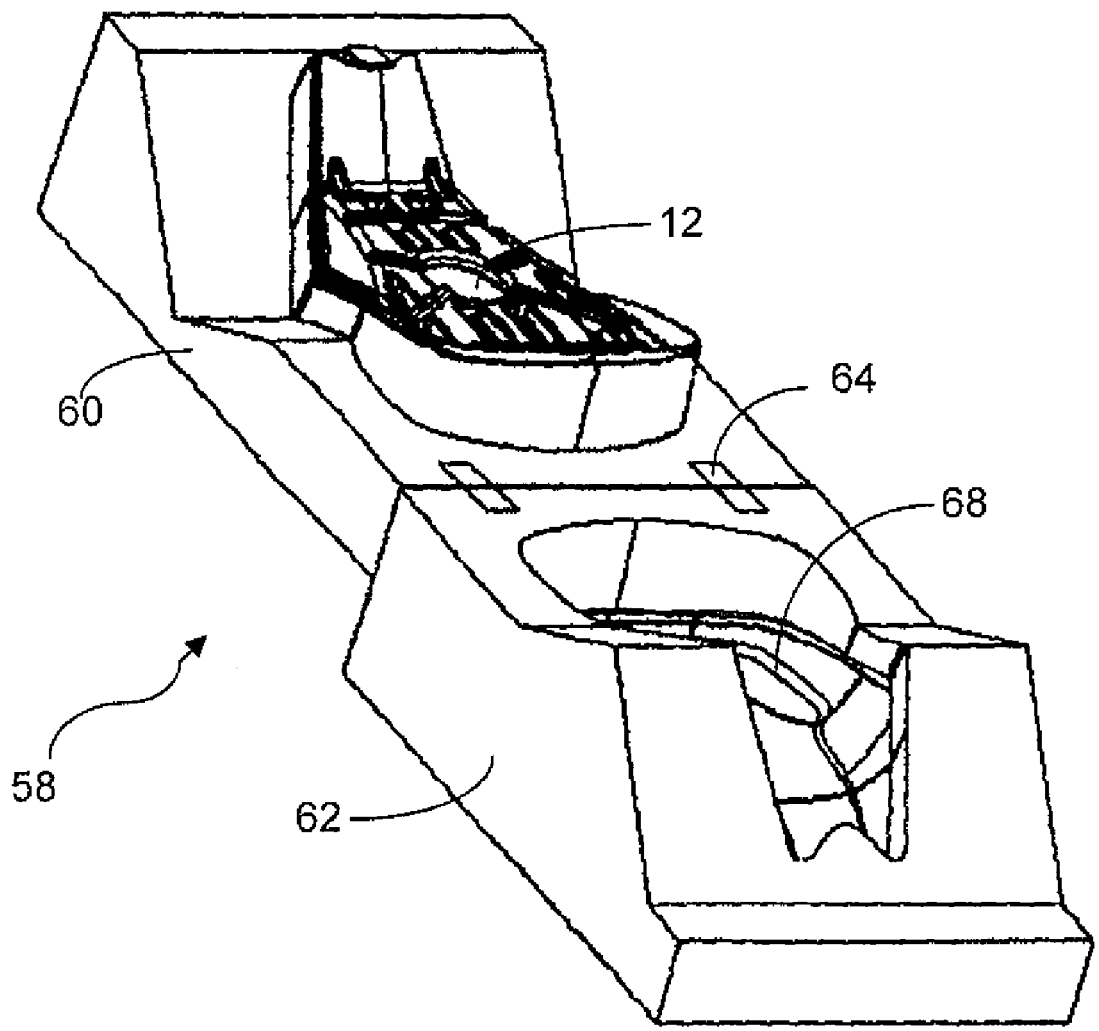
FIG. 15 is perspective view of the seat-forming tool of FIG. 14 having the seat base mounted thereon according to an embodiment of the invention.
Figure 16:
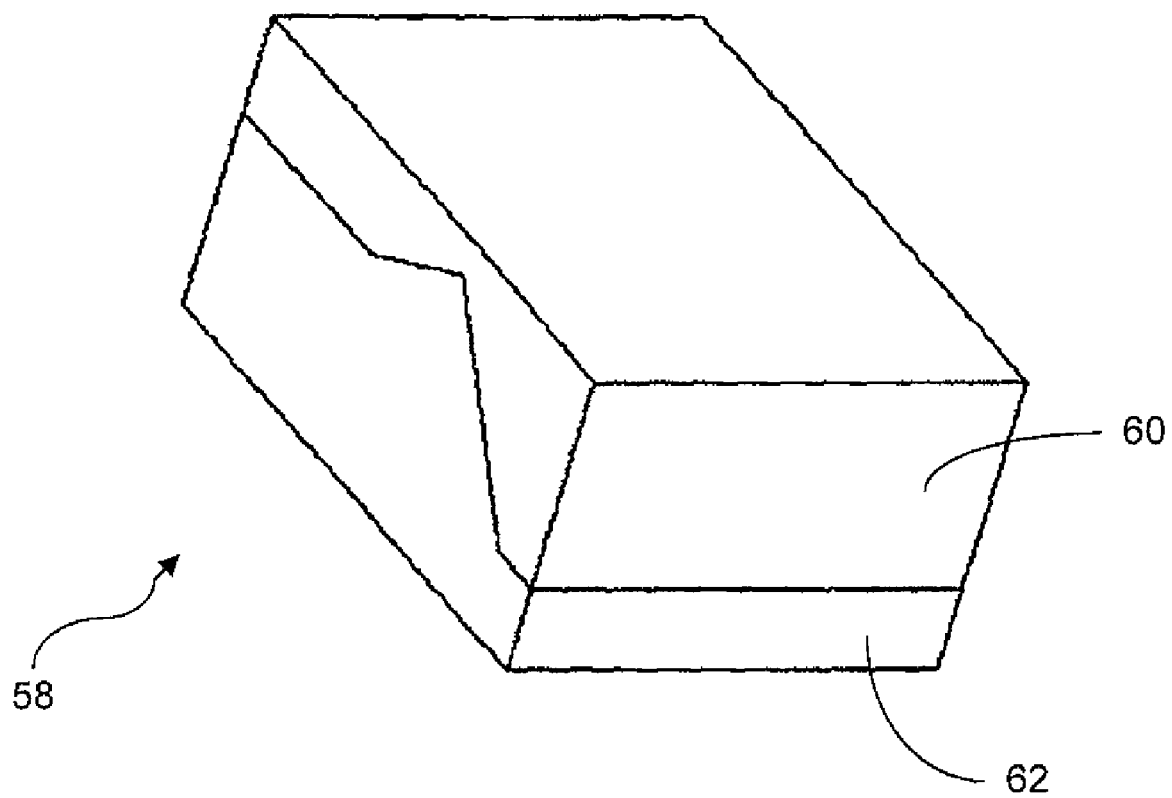
FIG. 16 is a perspective view of the seat-forming tool of FIG. 14 in a closed configuration of FIG. 1.

Referring to FIGS. 14 and 15, the first portion 60 of the tool has a base receiving area 66 which temporarily receives a bottom surface 16 of the seat base 12. The base receiving area 66 has grooves and other configurations that are mateable with those configurations seen on the bottom surface 16 of the seat base 12. A seat base 12 is simply placed within the receiving area 66 and is temporarily locked in place. The base can be temporarily held in place by numerous methods including using clamps, clips, Velcro and the like. FIG. 15 illustrates the tool 58 wherein the first portion 60 is loaded with a seat base 12 and is ready for use.

The second portion 62 of the tool 58 generally functions as a mold and includes a cavity 68 having a desired shape. The second portion 62 can be a primary mold, secondary mold, or other mold. In the illustrated embodiment, the second portion 62 includes a secondary mold or other mold designed for affixing a seat base 12 to the cushion material 18. The outer perimeter of the cavity 68 is configured to correspond to the outer perimeter of the seat base 12 so that once the tool 58 is closed together, the seat base 12 is placed within the cavity 68 and the opening is sealed.

While the illustrated seat assembly tool 58 includes a secondary mold configured to receive a seat base, it should be understood that tools including a primary mold are also within the scope of the invention. In such tools, the first portion includes a lid having a protrusion rather than a seat base receiving area. When the first and second portions are closed together, as shown in FIG. 16, the protrusion extends downwardly into the cavity of the second portion to impart shape into the cushion material 18. Additionally, it should be understood that tools including molds other than primary or secondary molds are within the scope of the invention.

Thus, embodiments of the invention are disclosed. One skilled in the art will appreciate that the present invention can be practiced with embodiments other than those disclosed. The disclosed embodiments are presented for purposes of illustration and not limitation, and the present invention is limited only by the claims that follow.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method of assembling an article, comprising the steps of:
    applying coating material into a cavity of a mold that defines a desired profile;
    depositing expandable cushion material into the cavity of the mold;
    closing a lid of the mold and allowing the expandable cushion material to expand to a volume defined by the mold and the lid;
    opening the lid; and
    adhering a base to the expandable cushion material by applying a coating material between the base and the expandable cushion material.

2. The method of claim 1 wherein the coating material is comprised of urethane.

3. The method of claim 1 wherein the coating material is comprised of polyurethane.

4. The method of claim 1 wherein the applying the coating material includes spraying the coating material.

5. The method of claim 1 wherein the expandable cushion material comprises one or more expandable foams.

6. The method of claim 5 wherein at least one expandable foam comprises an expandable isocyanate foam.

7. The method of claim 1 wherein the base is a flame treated base.

8. The method of claim 1 wherein the cavity of the mold has a surface including one or more features so that the coating material retains such features when it forms a skin.

9. The method of claim 8 wherein the one or more features is selected from the group consisting of decals, fabrics, vinyls, leathers, rubbers and paints.

10. The method of claim 8 wherein the one or more features includes textures.

11. The method of claim 1 wherein the lid contains an underside which projects into the cavity to impart a shape in the expandable cushion material once expanded.

12. The method of claim 11 wherein the base is configured to mate with the shape in the expandable cushion material created by the underside.

13. The method of claim 11 wherein the underside of the lid further includes a protrusion which projects deeper into the cavity than the underside to impart a shape in the expandable cushion material once expanded to form a breathable cavity.

14. The method of claim 13 wherein the base is configured to mate with the shape in the expandable cushion material created by the underside so that the breathable cavity is formed between the base and the expandable cushion material.

15. The method of claim 1 further comprising removing the expandable cushion material from the cavity and placing the expandable cushion material into a cavity of a secondary mold before adhering the base to the expandable cushion material.

16. The method of claim 15 wherein the opening of the cavity of the secondary mold is larger than the opening of the cavity from which the expandable cushion material is removed.

17. The method of claim 1 further comprising removing the expandable cushion material from the cavity and placing the expandable cushion material into a fixture prior to adhering the base to the expandable cushion material.

18. The method of claim 17 wherein applying a coating material between the base and the expandable cushion material comprises placing a bead of coating material between the base and the expandable cushion material.

19. The method of claim 1 wherein applying a coating material between the base and the expandable cushion material seals the expandable cushion material with the coating material.

20. The method of claim 1 wherein applying a coating material between the base and the expandable cushion material does not seal the expandable cushion material with the coating material.

21. The method of claim 20 wherein a vapor permeable, liquid impermeable membrane is applied to the article to seal the expandable cushion material from liquid.

22. The method of claim 1, wherein the coating material is liquid.

23. The method of claim 22, further comprising the step of curing the coating material to form a protective cover, the curing step occurring after the step of applying coating material into a cavity of a mold and before the step of depositing expandable cushion material into the cavity of the mold.

24. The method of claim 23, wherein the step of closing the lid of the mold occurs after the step of depositing expandable cushion material into the cavity of the mold and prior to the step of opening the lid.

25. The method of claim 24, wherein the step of adhering the protective cover to the expandable cushion material occurs while the expandable cushion material is expanding.

26. The method of claim 25, wherein the step of closing the lid of the mold occurs prior to the step of adhering a base to the expandable cushion material.

* * * * *